(12) United States Patent
Cheng

(10) Patent No.: US 8,115,856 B2
(45) Date of Patent: Feb. 14, 2012

(54) CAMERA MODULE

(75) Inventor: Su-Jen Cheng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 538 days.

(21) Appl. No.: 12/262,171

(22) Filed: Oct. 30, 2008

(65) Prior Publication Data

US 2009/0244356 A1  Oct. 1, 2009

(30) Foreign Application Priority Data

Mar. 25, 2008 (CN) .......................... 2008 1 0300697

(51) Int. Cl.
 *G03B 13/00* (2006.01)
(52) U.S. Cl. ...................................... 348/357; 396/529
(58) Field of Classification Search .................. 348/357; 396/529; 310/12.16
See application file for complete search history.

(56) References Cited

U.S. PATENT DOCUMENTS

| | | | |
|---|---|---|---|
| 7,570,880 B2 | 8/2009 | Yoon et al. | |
| 2005/0276027 A1* | 12/2005 | Shen et al. | 361/753 |
| 2006/0050490 A1* | 3/2006 | Ootani | 361/755 |
| 2006/0055252 A1* | 3/2006 | Tseng | 310/14 |
| 2006/0257131 A1* | 11/2006 | Yoon et al. | 396/133 |
| 2008/0037143 A1* | 2/2008 | Yoon | 359/824 |
| 2008/0069557 A1* | 3/2008 | Ishizawa et al. | 396/529 |
| 2008/0304290 A1* | 12/2008 | Pelrine et al. | 363/16 |
| 2010/0158508 A1* | 6/2010 | Kim | 396/529 |

FOREIGN PATENT DOCUMENTS

| | | |
|---|---|---|
| CN | 1707698 A | 12/2005 |
| CN | 1744793 A | 3/2006 |
| CN | 1862359 A | 11/2006 |
| WO | 2008023894 A1 | 2/2008 |

\* cited by examiner

*Primary Examiner* — Clayton E Laballe
*Assistant Examiner* — Warren Fenwick
(74) *Attorney, Agent, or Firm* — Altis Law Group, Inc.

(57) ABSTRACT

A camera module includes a circuit board of a grounding pad, a lens module, and a voice-coil motor. The voice-coil motor for receiving and driving the lens module automatically focus comprises a main body, a metallic casing and a grounding structure. The metallic casing covers the main body. After electrically grounding by connecting with the grounding pad of the circuit board, the grounding structure connects with the metallic casing and the circuit board. With the grounding structure, the metallic casing can be grounded. Thereby, prevent external electro-magnetic waves from affecting electrical signals communicated between the camera module and the circuit board.

2 Claims, 4 Drawing Sheets ably, the attachable part 123 can bend more than 90 degrees relative to the connecting part 121.

The image sensor 2 is mounted on the first surface 101 of the main body 10 and received between the lens module 5 and the main body 10 of the circuit board 1.

The bracket 3 is mounted on the circuit board 1 and configured for supporting the voice-coil motor 4. The bracket 3 defines a first through hole 30 for receiving the image sensor 2 therein when the bracket 3 is mounted on the circuit board 1.

The voice-coil motor 4 is assembled on the bracket 3 and capable of automatically focusing the lens module 5 by moving the lens module 5. The voice-coil motor 4 includes an insulative body 40, a metallic casing 42, a pair of electrodes 44 and a grounding structure 46. The voice-coil motor 4 can be secured on the bracket 3 by adhesive means.

The insulative body 40 is a focus adjusting mechanism and covered by the metallic casing 42. The insulative body 40 defines a receiving room (no shown) for receiving the lens module 5 corresponding to the first through hole 30.

The metallic casing 42 defines a passage 421 in the center thereof corresponding to the receiving room. The passage 421 is configured for allowing light to travel to the lens module 5.

The pair of electrodes 44 are electrically connected with the insulative body 40 and extend out of the metallic casing 42 without contacting therewith. The pair of electrodes 44 include a positive electrode 441 and a negative electrode 443 and are configured for supplying power to the voice-coil motor 4. The pair of electrodes 44 can supply power to the voice-coil motor 4 by electrically connecting the positive electrode and the negative electrode 443 with the power pads 16, 18 of the circuit board 1 respectively.

The grounding structure 46 is configured for electrically connecting with the metallic casing 42 and the circuit board 1. The grounding structure 46 has a securing portion 461 and a connecting portion 463 extending therefrom. The securing portion is configured for fixing the grounding structure 46 to the metallic casing 42. The connecting portion 463 is configured for connecting with the grounding pad 14 of the circuit board 1. In the present embodiment, the grounding structure 46 is a metallic plate extending from the metallic casing 42.

When the grounding structure 46 electrically connects the metallic casing 42 and the grounding pad 14 of the circuit board 1, the metallic casing 42 is grounded. Thus, the metallic casing 42 can prevent external electro-magnetic waves from affecting electrical signals of the camera module 100 and the circuit board 1. Preferably, the location of the grounding pad 14 in the circuit board 1 corresponds to the location of the grounding structure 46 of the metallic casing 42.

The lens module 5 is received in the passage 421 of the voice-coil motor 4 and can be automatic focused by the voice-coil motor 4.

Referring to FIG. 4, a camera module 200 according to a second exemplary embodiment, includes a circuit board 1a, an image sensor (no shown), a bracket 3a, a voice-coil motor 4a and a lens module 5a. The camera module 200 is similar to the camera module 100 of the first embodiment. The difference between the camera module 200 and the camera module 100 is that the grounding structure 46a is an elastic structure. The grounding structure 46a includes a securing portion 461a, a connecting portion 463a, and a tail 465a. The securing portion 461a is configured for fixing the connecting portion 463a to the metallic casing 42a. The tail 465a is configured for fixing the connecting portion to the circuit board 1a. The connecting portion 463a is configured for connecting with the securing portion 461a and the tail 465a. The securing portion 461a of the grounding structure 46a can be soldered

CAMERA MODULE

BACKGROUND

1. Technical Field

The present invention relates to camera modules and, more particularly, to a camera module with enhanced electro-magnetic interference (EMI) shielding.

2. Description of the Related Art

Following the development of micro-circuitry and multi-media technology in recent years, digital cameras are now commonly used. Voice-coil motors are usually used for driving lens modules of the camera modules for automatic focus. A voice-coil motor always generates electro-magnetic waves and the electro-magnetic waves may affect proper functioning of other electronic components in the camera module.

What is needed, therefore, is a camera module with enhanced electro-magnetic interference (EMI) shielding.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module. Moreover, in the drawing, like reference numerals designate corresponding parts throughout the several views.

DETAILED DESCRIPTION OF THE EMBODIMENTS

Embodiments of the present invention will now be described in detail below, with reference to the accompanying drawings.

Figure 1:
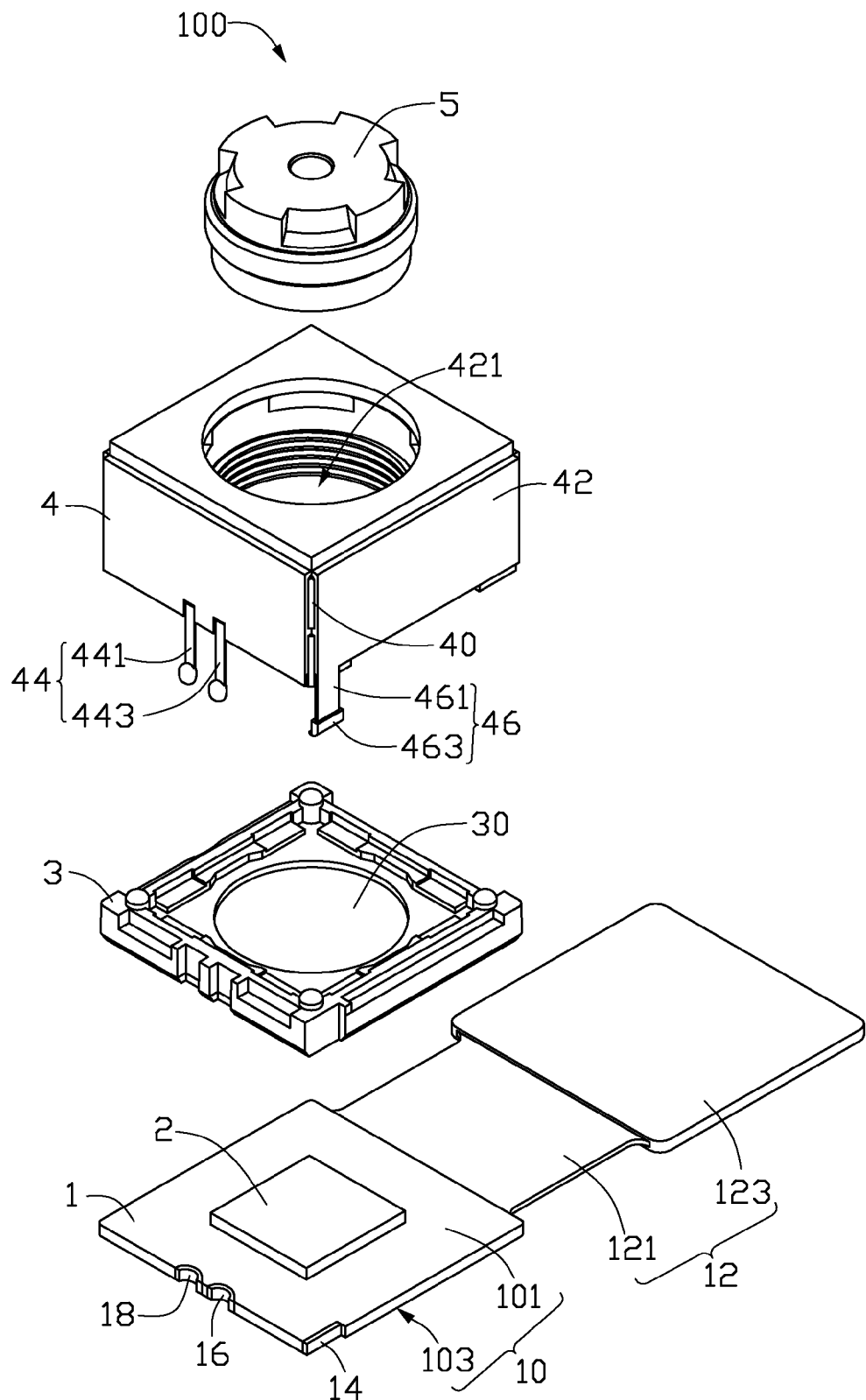
FIG. 1 is an exploded view of a camera module according to a first exemplary embodiment.
Figure 2:
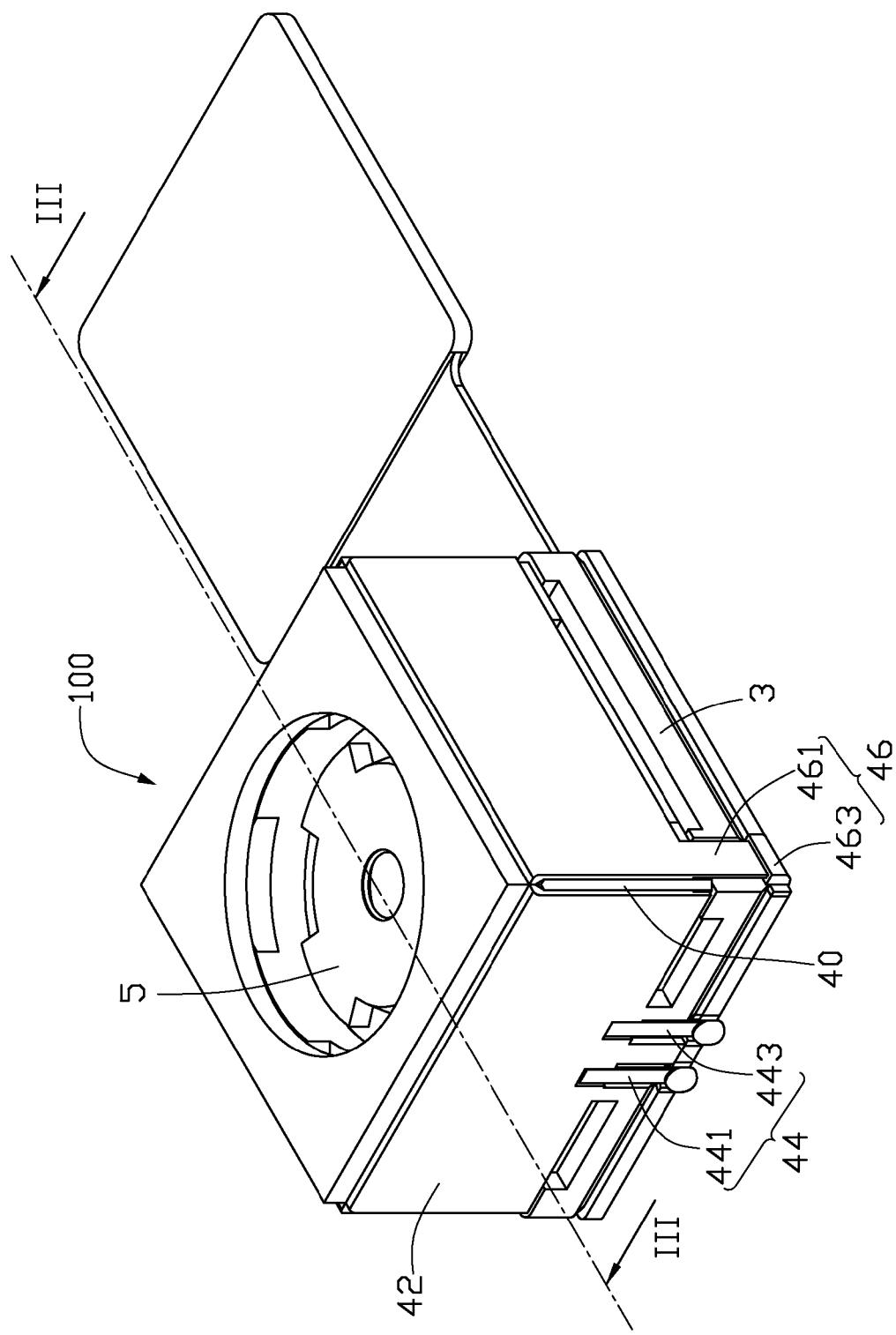
FIG. 2 is a schematic isometric view of the camera module of FIG. 1 after being assembled.
Figure 3:
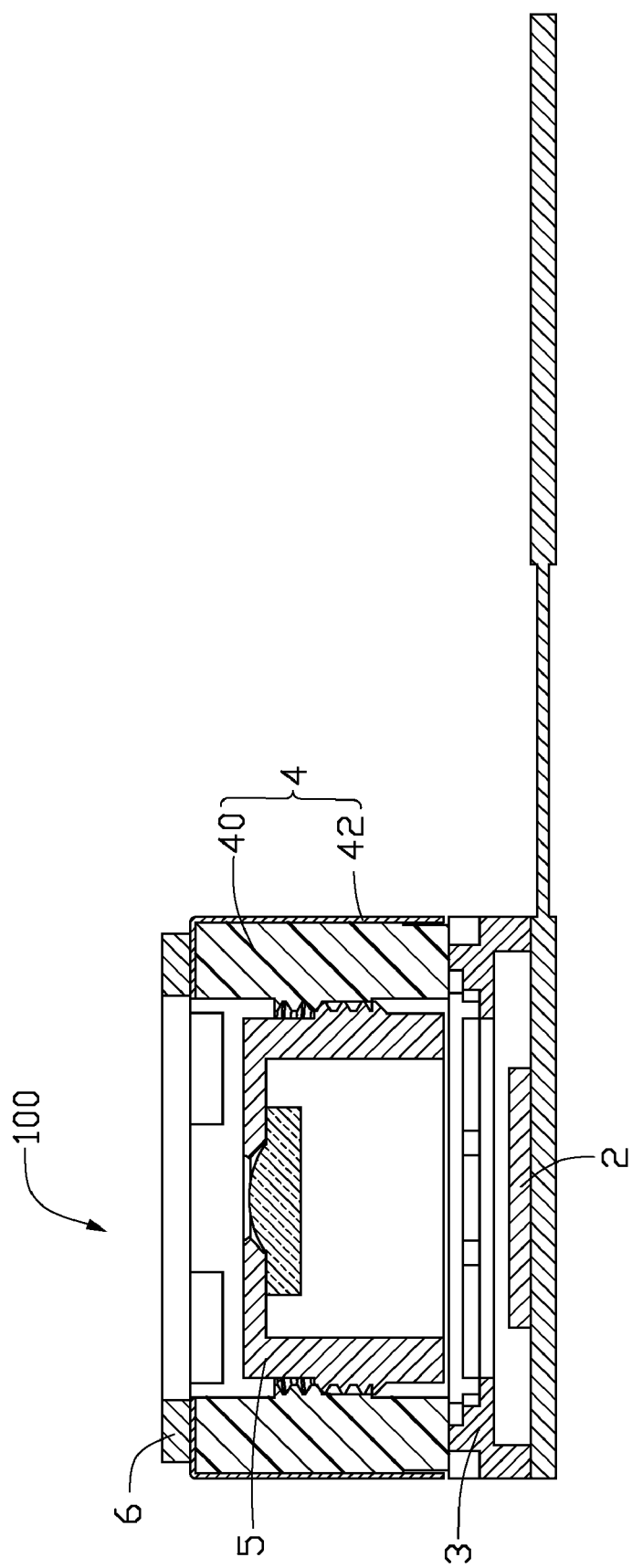
FIG. 3 is a cross-section view of the cameral module of FIG. 2 taken along the line III-III.
Figure 4:
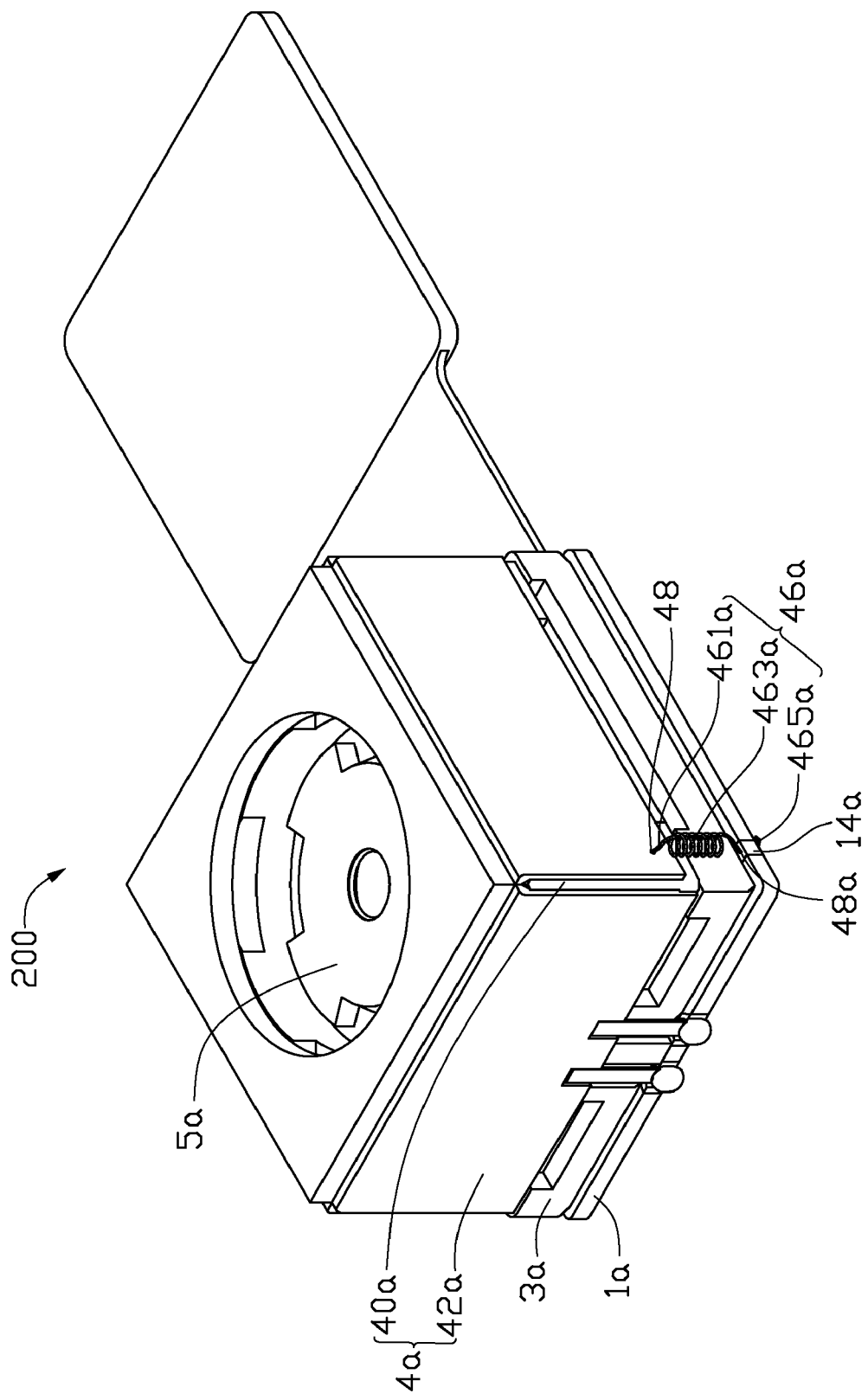
FIG. 4 is a schematic isometric view of a camera module according to a second exemplary embodiment.

Referring to FIGS. 1-3, a camera module 100 according to a first exemplary embodiment is shown. The camera module 100 includes a circuit board 1, an image sensor 2, a bracket 3, a voice-coil motor 4 and a lens module 5.

In the present embodiment, the circuit board 1 is a printed circuit board. The circuit board 1 includes a main body 10 and a flexible bending portion 12 electrically connecting with the main body 10. The circuit board 1 also includes a grounding pad 14 and two power pads 16, 18 for supplying power to the voice-coil motor 4.

The main body 10 has a first surface 101 and a second surface 103 opposite to the first surface 101. The image sensor 2, the grounding pad 14 and two power pads 16, 18 are mounted on the first surface 101 respectively.

The bending portion 12 extends from a side surface of the main body 10 and can bend relative to the main body 10. The bending portion 12 is configured for connecting the main body 10 with other electronic components (no shown). The bending portion 12 includes a connecting part 121 connected to the main body 10 and an attachable part 123 extending from the connecting part 121. The attachable part 123 is capable of being bending relative to the connecting part 121 about a joining line parallel to the first surface 101, between the attachable part 123 and the connecting part 121. Preferon the metallic casing 42*a* and the tail 465*a* of the grounding structure 46*a* can be soldered on the grounding pad 14*a* of the circuit board 1*a*. In this embodiment, the grounding structure 46*a* is a tension spring with two end connected with the metallic casing 42*a* and the grounding pad 14*a* respectively. The metallic casing 42*a* defines a first hole 48 for linking up one end of the tension spring and the grounding pad 14*a* defines a second hole 48*a* for linking up the other end of the tension spring. The location of the first hole 48 in the metallic casing 42*a* corresponds to the location of the second hole 48*a* in the grounding pad 14*a* of the circuit board 1*a*. Because of the elastic force of the tension spring, the camera module 200 does need other structures to secure the voice-coil motor 4*a*.

The grounding structure electrically connecting the corresponding grounding pad of the printed circuit board with the metallic casing. Therefore, external electro-magnetic waves generated by the voice-coil motor can be grounded via the grounding structure.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A camera module comprising:
a circuit board comprising a grounding pad;
a voice-coil motor mounted on the circuit board comprising an insulative body, a metallic casing covering the insulative body, and a grounding structure mounted on the metallic casing for electrically grounding and connecting the metallic casing with the grounding pad of the circuit board, the grounding structure being an elastic structure, the elastic structure being a tension spring; wherein the metallic casing defines a first hole for linking up one end of the tension spring and the grounding pad defines a second hole for linking up the other end of the tension spring; and
a lens module received in the voice-coil motor and capable of being driven by the voice-coil motor to automatically focus.

2. The camera module as claimed in claim 1, wherein the location of the first hole in the metallic casing corresponds to the location of the second hole in the grounding pad of the circuit board.

\* \* \* \* \*